United States Patent
Ingram, Jr. et al.

(10) Patent No.: US 8,691,037 B2
(45) Date of Patent: Apr. 8, 2014

(54) METHOD FOR MINIMIZING FIBER DISTORTION DURING FABRICATION OF ONE-PIECE COMPOSITE BARREL SECTION

(75) Inventors: William H. Ingram, Jr., Puyallup, WA (US); Kenneth M. Dull, Puyallup, WA (US); Robert Biornstad, Auburn, WA (US)

(73) Assignee: The Boeing Company, Chicago, IL (US)

( * ) Notice: Subject to any disclaimer, the term of this patent is extended or adjusted under 35 U.S.C. 154(b) by 596 days.

(21) Appl. No.: 11/638,804

(22) Filed: Dec. 14, 2006

(65) Prior Publication Data

US 2010/0024964 A1 Feb. 4, 2010

(51) Int. Cl.
*B29C 65/02* (2006.01)

(52) U.S. Cl.
USPC ........... 156/245; 156/189; 156/285; 264/258; 425/388

(58) Field of Classification Search
USPC ............... 156/189; 425/387.1, 388, 389, 393, 425/450.1, 501, 503, 504; 244/119
See application file for complete search history.

(56) References Cited

U.S. PATENT DOCUMENTS

| | | | |
|---|---|---|---|
| 2,999,272 A * | 9/1961 | Warnken | 425/389 |
| 3,265,795 A * | 8/1966 | Medney | 264/157 |
| 4,169,749 A * | 10/1979 | Clark | 156/156 |
| 4,242,160 A * | 12/1980 | Pinter et al. | 156/175 |
| 5,084,219 A | 1/1992 | Sigur | |
| 5,173,315 A * | 12/1992 | Charlson et al. | 425/403 |
| 5,223,067 A * | 6/1993 | Hamamoto et al. | 156/173 |
| 5,597,435 A | 1/1997 | Desautels et al. | |
| 5,817,269 A | 10/1998 | Younie et al. | |
| 5,853,651 A | 12/1998 | Lindsay et al. | |
| 5,900,194 A * | 5/1999 | Ashton | 264/39 |
| 6,217,000 B1 | 4/2001 | Younie et al. | |
| 6,458,309 B1 * | 10/2002 | Allen et al. | 264/319 |
| 6,613,258 B1 * | 9/2003 | Maison et al. | 264/102 |
| 2006/0068170 A1 * | 3/2006 | Hanson | 428/174 |
| 2006/0108055 A1 | 5/2006 | Pham et al. | |

(Continued)

FOREIGN PATENT DOCUMENTS

GB 103888 A 8/1966
WO WO-2006/001860 A2 1/2006

OTHER PUBLICATIONS

Mazumdar, S. K., Composites Manufacturing—Materials, Product, and Process Engineering, CRC Press, 2002, section 6.8.1.5.*

(Continued)

*Primary Examiner* — William Bell
(74) *Attorney, Agent, or Firm* — Ostrager Chong Flaherty & Broitman P.C.

(57) ABSTRACT

A method for fabricating a one-piece composite fuselage section that minimizes out-of-plane fiber distortion. This is accomplished by fabricating a mandrel having a coefficient of thermal expansion in the hoopwise direction that is sufficiently greater than that of the laid-up composite ply assembly. As a result of this differential in the coefficients of thermal expansion in the hoopwise direction, the laid-up composite ply assembly is stretched circumferentially as the mandrel expands radially during cure, thereby eliminating or reducing out-of-plane fiber distortion. At the same time, the mandrel and part being fabricated should have substantially the same coefficient of thermal expansion in the lengthwise direction. As the outer surface of the mandrel increases in circumference, the circumferentially oriented reinforcing fibers of the inner plies are stretched, while the circumferentially oriented reinforcing fibers of the outer plies do not reduce in circumference and thus do not form waves or wrinkles.

20 Claims, 10 Drawing Sheets

(56) References Cited

U.S. PATENT DOCUMENTS

2006/0231682 A1* 10/2006 Sarh .............................. 244/119
2007/0261788 A1* 11/2007 Stenard ...................... 156/307.1

OTHER PUBLICATIONS

U.S. Appl. No. 10/851,381, filed May 20, 2004 and entitled "Composite Barrel Sections for Aircraft Fuselages etc.".

* cited by examiner

METHOD FOR MINIMIZING FIBER DISTORTION DURING FABRICATION OF ONE-PIECE COMPOSITE BARREL SECTION

TECHNICAL FIELD

This disclosure relates generally to fabrication of large composite structures and, more particularly, to fabrication of large composite barrel sections for aircraft fuselages and other structures.

BACKGROUND

The structural performance advantages of composites, such as carbon fiber/epoxy and graphite/bismaleimide (BMI) materials, are widely known in the aerospace industry. Aircraft designers have been attracted to composites because of their superior stiffness, high strength, light weight and radar-absorbing capabilities, for example. As more advanced materials and a wider variety of material forms have become available, aerospace usage of composites has increased, providing improved aircraft performance and fuel economy. Automated tape layer technology has developed to become a widely used automated process for fabrication of large composite structures such as wing panels and empennage. Current tape layer technology has been improved to offer flexibility in process capabilities required for a wide variety of aerospace components. As aerospace industry tape laying applications achieve material lay up rates, for example, that may help control the manufacturing cost of large composite structures, new and innovative applications for tape layers may be defined, such as the automated tape lay up of large aircraft fuselage sections.

Automated tape laying machines typically are gantry style machines that may have, for example, ten axes of movement with 5-axis movement on the gantry and 5-axis movement on the delivery head. A typical automated tape layer consists of a gantry structure (parallel rails), a cross-feed bar that moves on precision ground ways, a ram bar that raises and lowers the material delivery head, and the material delivery head which is attached to the lower end of the ram bar. Commercial tape layers are generally configured specifically for lay up of flat or mildly contoured laminate applications using either flat tape laying machines (FTLM) or contour tape laying machines (CTLM). On a gantry style tape layer, tooling (or a flat table) is commonly rolled under the gantry structure, secured to the floor, and the machine delivery head is then initialized to lay up the surface.

In the quest to automate the placement of composite materials at a high rate and to make the use of composites economical compared to conventional methods of fuselage fabrication, efforts have been focused at wrapping composite fiber material around a male mandrel, also referred to as "tool". Today's composite, fiber material placement processes and equipment have typically used male mandrels, wrapping tape layers on the outside surface of the tool.

After the composite materials have been placed on the outer surface of the mandrel, the composite materials are wrapped to form a bag that will be evacuated. The composite materials must then be cured by applying heat and pressure. The processing or fabrication of these materials is typically conducted in an autoclave, allowing the concurrent application of heat and pressure.

During cure, composite parts reduce in thickness or debulk as compared to their laid-up non-cured state. When a vacuum is applied to a laminate disposed around a mandrel, the bulk may be reduced, making the composite structure thinner and more dense. The outer plies, sized to the pre-debulk circumference, are suddenly too long and distort or buckle as they are compressed and forced to reposition into a smaller volume. This debulking process, while making a cylindrical or barrel-shaped section, has a propensity for producing out-of-plane fiber distortion, i.e., fiber waviness or fiber wrinkling. These waves or wrinkles can interfere with final assembly.

There is a need for a technical solution that will minimize out-of-plane fiber distortion during fabrication of a one-piece fuselage section using composite materials.

SUMMARY

The disclosed embodiments are directed to methods for fabricating a one-piece composite barrel section that minimize out-of-plane fiber distortion. This is accomplished by fabricating a grooved mandrel having a coefficient of thermal expansion in the hoopwise (i.e., circumferential) direction that is greater than that of the laid-up composite ply assembly. As a result of this differential in the coefficients of thermal expansion in the hoopwise direction, the laid-up composite ply assembly is stretched circumferentially as the mandrel expands radially during cure, thereby eliminating or reducing out-of-plane fiber distortion. At the same time, the mandrel and part being fabricated can have coefficients of thermal expansion in the lengthwise direction that are approximately equal. As the outer surface of the mandrel increases in circumference, the circumferentially oriented reinforcing fibers of one or more plies (e.g., the innermost plies) are stretched while the circumferentially oriented reinforcing fibers of the outermost plies are stretched less, if at all. The mandrel and laid-up composite ply assembly are designed such that during thermal expansion, the reinforcing fibers in the outermost plies do not reduce in circumference and thus do not form waves or wrinkles.

One aspect is a method for fabricating a one-piece composite barrel section, comprising the following steps: (a) laying a composite ply assembly around a mandrel having a coefficient of thermal expansion in a hoopwise direction that is greater than the coefficient of thermal expansion of the composite ply assembly in the hoopwise direction; and (b) raising the temperature and pressure within a volume surrounding the composite ply assembly, the temperature increase being sufficient to cause the circumference of the mandrel to expand and stretch one or more plies of the composite ply assembly.

Another aspect is a method for fabricating a one-piece composite barrel section, comprising the following steps: (a) laying a plurality of plies of a composite material around a mandrel to form a composite ply assembly, each ply comprising reinforcing fibers and polymeric material, the mandrel having a coefficient of thermal expansion in a hoopwise direction that is greater than the coefficient of thermal expansion of the composite ply assembly in the hoopwise direction; and (b) raising the temperature and pressure within a volume surrounding the composite ply assembly, the temperature increase being sufficient to cause the circumference of the mandrel to expand, which in turn causes the length of reinforcing fibers in one or more plies of the composite ply assembly to increase.

A further aspect is a mandrel for fabricating a one-piece composite barrel section, comprising a body having a lengthwise axis and an outer circumferential surface, the body having a coefficient of thermal expansion in a direction parallel to the lengthwise axis that is smaller than its coefficient of thermal expansion in a hoopwise direction.

Yet another aspect is an airplane comprising a fuselage section made of composite material by a method comprising the following steps: (a) laying a composite ply assembly around a mandrel having a coefficient of thermal expansion in a hoopwise direction that is greater than the coefficient of thermal expansion of the composite ply assembly in the hoopwise direction; and (b) raising the temperature and pressure within a volume surrounding the composite ply assembly, the temperature increase being sufficient to cause the circumference of the mandrel to expand and stretch one or more plies of the composite ply assembly.

Other aspects are disclosed and claimed below.

BRIEF DESCRIPTION OF THE DRAWINGS

Reference will now be made to the drawings in which similar elements in different drawings bear the same reference numerals.

DETAILED DESCRIPTION

The method disclosed herein is especially suited for fabricating sections of an airplane fuselage using composite material, but is not limited to that application. In general, the method could be used to make barrel-shaped sections of a fuselage, rocket casing, hull, frame or other body. Moreover, in the particular example disclosed below, the fuselage section is made of carbon fiber/epoxy material. However, other composite materials could be used, such as (but not limited to) graphite/BMI material.

The following disclosure describes composite barrel sections for aircraft fuselages and other structures, and methods and systems for manufacturing such barrel sections. Throughout this disclosure, the term barrel section is used for convenience to refer generally to an enclosed shell structure extending 360 degrees about an axis. Such structures can include, for example, cylindrical shells having circular, oval, elliptical, egg-shaped, and other symmetrical and/or asymmetrical cross-sectional shapes. Such structures can further include enclosed, non-cylindrical shells. Certain details are set forth in the following description to provide a thorough understanding of various embodiments. Other details describing well-known structures and systems often associated with aircraft structures and composite fabrication techniques are not set forth in the following disclosure to avoid unnecessarily obscuring the description of the various embodiments.

Many of the details, dimensions, angles, and other features shown in the drawings are merely illustrative of particular embodiments. Accordingly, other embodiments can have other details, dimensions, angles, and features. In addition, further embodiments may be practiced without several of the details described below.

Figure 1:
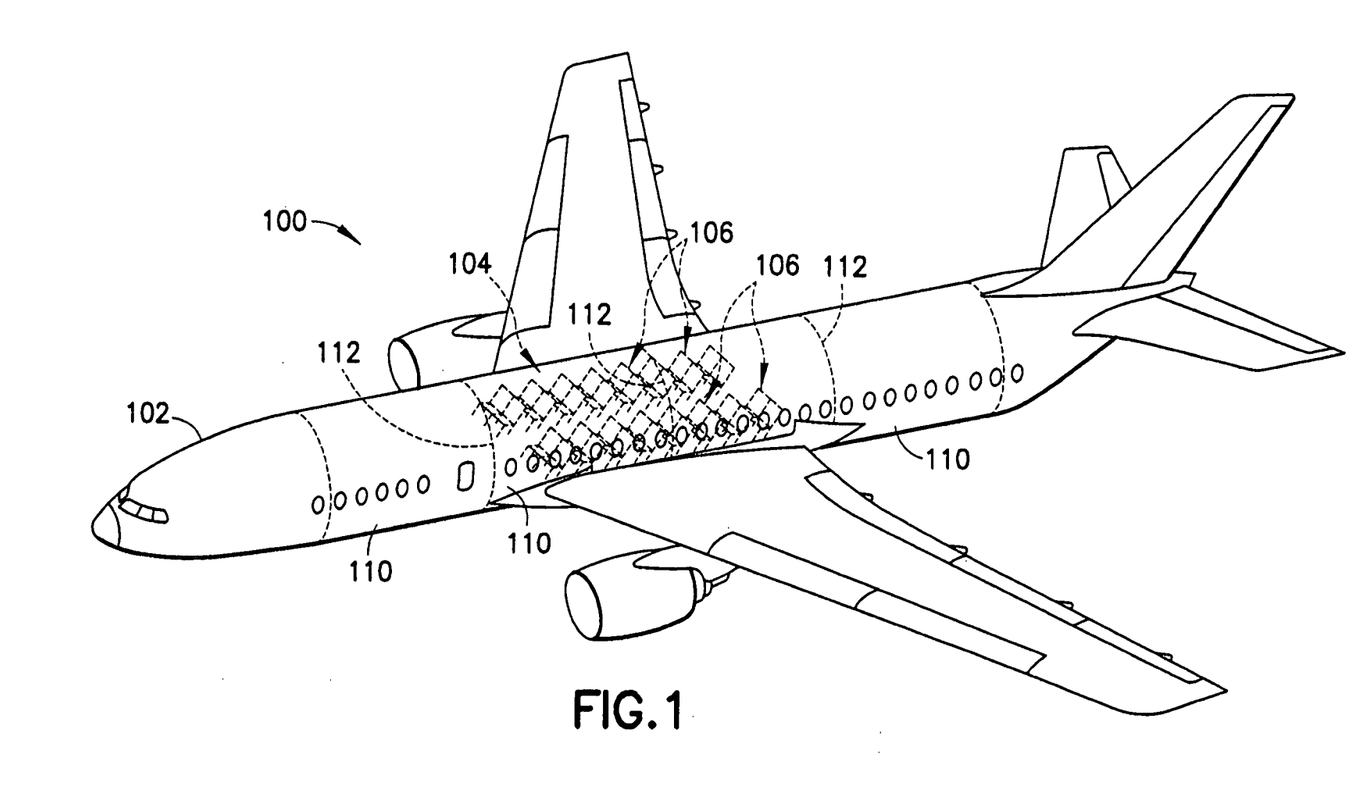
FIG. 1 is an illustration showing a partially hidden isometric view of an aircraft having a fuselage that includes a plurality of barrel sections fabricated in accordance with one embodiment

FIG. 1 is a partially hidden isometric view of an aircraft 100 having a fuselage 102 that includes a plurality of barrel sections 110 configured in accordance with one embodiment. In one aspect of this embodiment described in greater detail below, each of the barrel sections 110 may be individually fabricated as a one-piece section from composite materials, such as (but not limited to) carbon fiber/epoxy and graphite/BMI materials. After fabrication, the barrel sections 110 may be joined together by adhesive bonding and/or mechanical fastening along circumferential joints 112 to form the fuselage 102. The fuselage 102 can include a passenger cabin 104 configured to hold a plurality of passenger seats 106. Alternatively, the passenger seats 106 may be omitted and the cabin space may be used for other purposes, such as transporting cargo.

Figure 2:
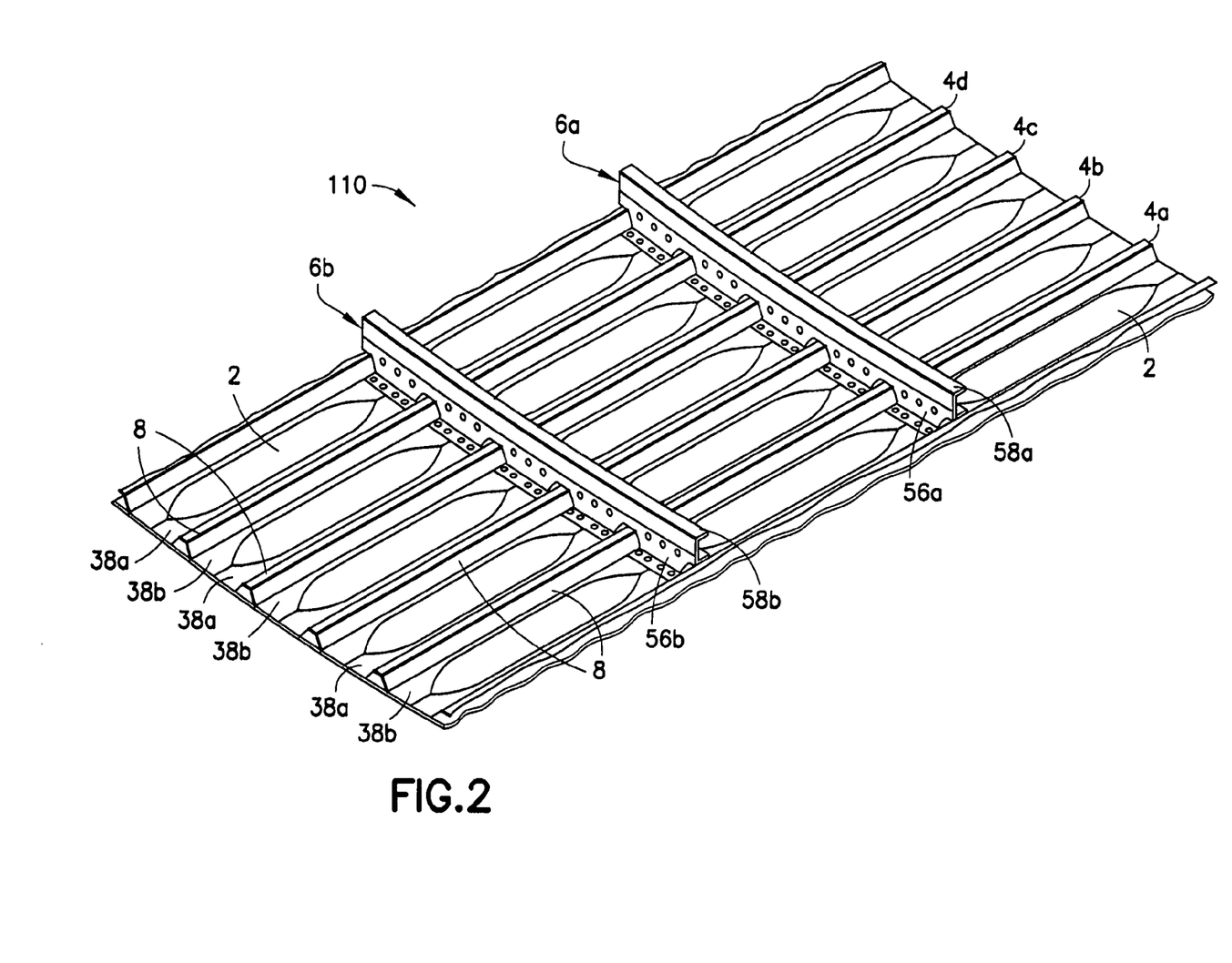
FIG. 2 is an illustration showing an isometric view of a portion of an assembled fuselage barrel section in accordance with one embodiment.

FIG. 2 shows an interior isometric view of an assembled portion of one of the barrel sections 110 seen in FIG. 1, fabricated in accordance with one embodiment. Each barrel section 110 can comprise a plurality of stiffeners 4 (identified individually as stiffeners 4a-4d in FIG. 2) attached to a skin 2. The skin 2 and the stiffeners 4 are made of composite material, e.g., reinforcing fibers in a polymeric matrix. Each of the stiffeners 4 can include a raised portion 8 projecting away from the skin 2 and a pair of flanges 38 (identified individually as flanges 38a and 38b in FIG. 2) extending in opposite directions and having a varying width. The flanges 38a and 38b of the stiffeners 4 may be mated directly to the skin 2. In the illustrated embodiment, the stiffeners 4 have hat-shaped cross sections. In other embodiments, however, the stiffeners can have other cross-sectional shapes.

In one embodiment described in greater detail below, the skin 2 and the stiffeners 4 are made of carbon fiber/epoxy composite material. The stiffeners 4 may be bonded to the skin 2. For example, the stiffeners 4 may be bonded to the skin 2 during a co-curing process in which the stiffeners 4 and the skin 2 are co-cured at elevated temperature and pressure. In another embodiment, the stiffeners 4 may be pre-cured and adhesively bonded to the skin 2 when exposed to elevated temperature and pressure.

Each of the stiffeners 4 may be positioned on the skin 2 so that the wide portions of flanges 38a and 38b of the stiffeners 4 are mutually aligned with abutting or nearly abutting edges. When the flanges 38a and 38b are aligned in the foregoing manner, the wide portions thereof can form a plurality of at least approximately continuous support surfaces extending between the raised portions 8 of the stiffeners 4.

Each barrel section 110 can further comprise a plurality of support members or frames 6 (identified individually as a first frame 6a and a second frame 6b in FIG. 2). In the illustrated embodiment, the frames 6a and 6b are two-piece frames that include a first frame section 56a and 56b, respectively, and a second frame section 58a and 58b, respectively. In this embodiment, each second frame section 58b has a C-shaped cross section. In other embodiments, the second frame section may have other cross-sectional shapes, such as an L-shaped cross section. In yet other embodiments, the frames 6 may be omitted or, alternatively, the barrel section 110 may include other frames composed of more or fewer frame sections. Each first frame section includes a base portion and an upstanding portion projecting away from the base portion. The upstanding portion may include a plurality of openings, e.g., "mouse holes", through which the raised portions 8 of the stiffeners 4 extend.

In accordance with one embodiment, the first frame sections 56a and 56b may be attached to the barrel section 110 first, and then the second frame sections 58a and 58b may be attached to the first frame sections. When attaching the first frame sections to the barrel section 110, the base portion of the first frame section is mated to the flanges of the stiffeners 4 without being mated to the skin 2. That is, the mating surfaces of the base portion of the first frame section contact the support surfaces formed by the flanges, but do not contact the skin 2. In this manner, the stiffener flanges are effectively sandwiched between the first frame sections and the skin 2. In one embodiment, the first frame sections 56a and 56b may be fastened to the barrel section 110 with a series of suitable fasteners. In another embodiment, the base portion of the first frame sections 56a and 56b may be adhesively bonded directly to the flanges 54. After each first frame section has been attached to the barrel section 110, a respective second frame section may be attached to that first frame section. In one embodiment, the second frame section may be fastened to the upstanding portion of the first frame section with a series of suitable fasteners. In another embodiment, the second frame section may be adhesively bonded to the upstanding portion of the first frame section. In other embodiments, however, the first frame sections may be attached to the second frame sections first, and then the frames 6a and 6b may be attached to the barrel section 110 as a complete unit.

In accordance with yet another embodiment, the flanges of the stiffeners 4 may be at least partially omitted. In this embodiment, a raised portion may be formed on the skin 2 between the stiffeners 4 with an additional ply or plies of material. The raised portion can take the place of the flanges in forming the support surface to which the base portions of the first frame sections mate.

Other stiffener configurations, such as those disclosed in U.S. patent application Ser. No. 10/851,381, filed on May 20, 2004 and incorporated herein in its entirety by reference, may be used (see, e.g., FIGS. 3A, 3B, 4A and 4B in that application).

FIG. 6 in the aforementioned U.S. patent application Ser. No. 10/851,381 shows a barrel section manufacturing system arranged on a factory floor. Such a barrel section manufacturing system may be used to fabricate barrel sections in accordance with various embodiments disclosed herein. That barrel section manufacturing system includes a series arrangement of manufacturing stations configured to manufacture the fuselage barrel sections described above with reference to FIGS. 1 and 2. As an overview, barrel section fabrication begins at a stiffener loading station before moving to a skin layup station. After skin lamination, the barrel section moves to a vacuum station for vacuum bagging, before moving to a curing station. From there, the barrel section moves successively to an inspection station, a trimming station and an assembly station.

The foregoing arrangement of manufacturing stations is but one arrangement that may be used to manufacture the fuselage barrel sections described herein. In other embodiments, other manufacturing arrangements and/or other types of manufacturing stations may be used in place of or in addition to one or more of the manufacturing stations mentioned in the preceding paragraph. For example, in accordance with one variation, one or more of the manufacturing stations may be positioned in a parallel arrangement rather than the serial-type arrangement. In accordance with another variation, two or more of the manufacturing stations may be combined to form a single station.

In the aforementioned barrel section manufacturing system (fully disclosed in U.S. patent application Ser. No. 10/851,381), the stiffener loading station has two stages whereby a plurality of stiffeners are loaded onto a barrel section tool assembly. The latter may comprise a rotatable tool fixture configured to support a plurality of tool segments in a cylindrical arrangement. In accordance with some embodiments, the tool segments can be made from carbon fiber/resin composite material. Each of the tool segments can include a plurality of stiffener grooves 34 (see FIG. 4 herein) configured to individually receive a corresponding stiffener 4 in the form of a hat-shaped stringer of the type shown in FIG. 2. Still referring to FIG. 4, each of the stiffeners 4 is inverted in the corresponding stiffener groove 34 so that the stiffener flanges 38a and 38b lie in corresponding recesses formed in the tool segment adjacent to the stiffener groove 34.

In accordance with one embodiment, the stiffeners may be uncured when placed in the stiffener grooves. In the uncured condition, the stiffeners are relatively flimsy. As a result, suitable tooling may be required to at least temporarily hold the stiffeners in position against the tool segments after installation in the stiffener grooves. In other embodiments, the stiffeners may be at least partially cured, in which case less or different tooling may be required to hold the stiffeners in position.

Once the tool segments are fully loaded with the stiffeners, the tool segments are loaded onto the rotatable tool fixture, thereby forming a rotatable mandrel. To prevent the stiffeners from falling out of the stiffener grooves during rotation, an innermost ply of composite fabric may be wrapped around the tool segments to hold the stiffeners in position. In other embodiments, the innermost ply may be omitted and the stiffeners may be held in position by other means, including local tooling clips or other features.

Figure 3:
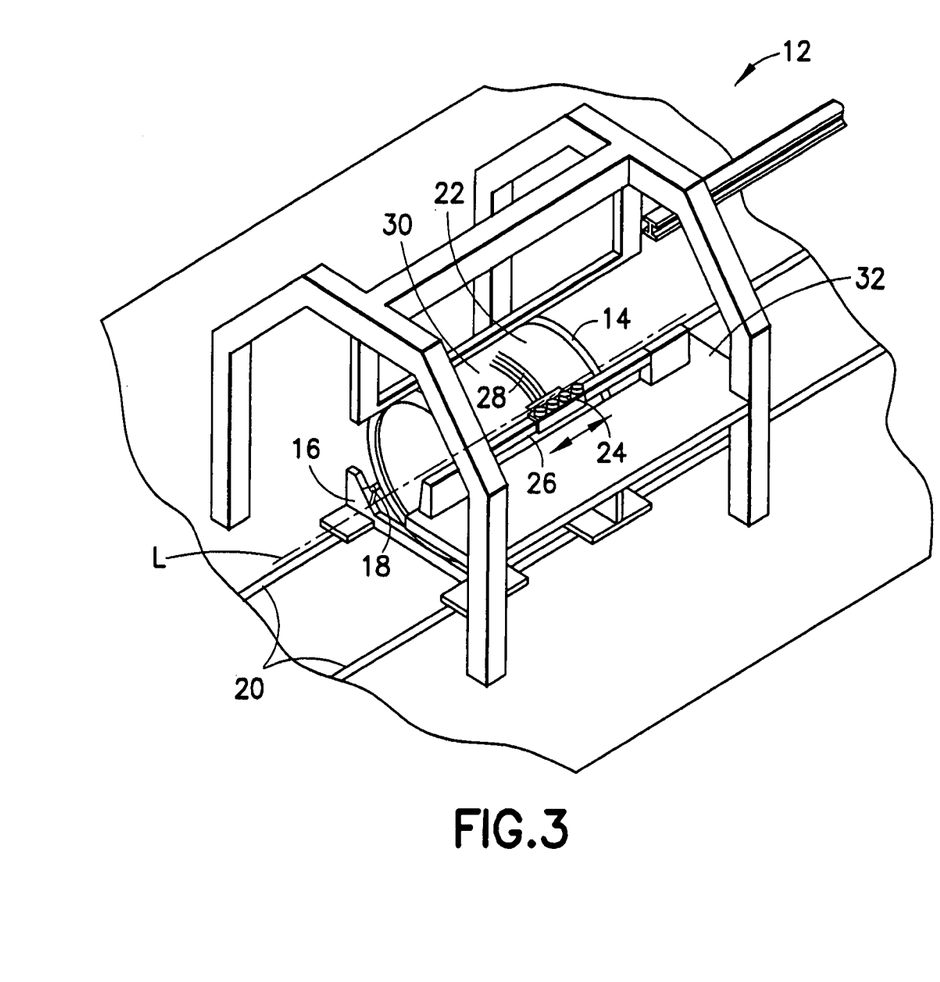
FIG. 3 is an illustration showing an isometric view of a skin layup station configured in accordance with one embodiment.

A skin layup station in accordance with one embodiment is shown in FIG. 3. After the innermost ply 22 has been fully installed, a tool support structure 16 transports the rotatable tool fixture (hereinafter "mandrel") 14 to the skin layup station 12 via a pair of floor tracks 20. The mandrel 14 is rotatably supported in the tool support structure 16 by means of a plurality of rollers 18, only one of which is shown in FIG. 3. Alternatively, a central spindle could be utilized to support and rotate the mandrel 14 in place of the external rollers 18. In a further embodiment, the individual tool segments may be omitted and instead the mandrel 14 can include a complete cylindrical surface configured to hold the stiffeners.

In one aspect of this embodiment, the layup station 12 includes a fiber placement machine 24 (shown schematically) movably supported on a track beam 26. The track beam 26 may be part of a work platform 32 positioned adjacent to the mandrel 14 when the mandrel is parked in the layup station 12. While not illustrated in detail in FIG. 3 for purposes of clarity, the fiber placement machine 24 can include one or more payoff heads configured to collimate multiple fiber tows 28. In addition, the fiber placement machine 24 can further include supporting hardware (such as material creels, compaction rollers, etc.) typically used with multi-axis, gantry-mounted placement machines to dispense, clamp, cut, and restart fiber tows and/or other composite materials such as fabric, tapes, individual filaments, and other uni- and multi-directional preimpregnated and non-preimpregnated composite materials and combinations thereof.

In operation, the fiber placement machine 24 moves back and forth along the track beam 26, laminating the collimated fiber tows 28 over the innermost ply 22 as the mandrel 14 rotates about the longitudinal axis A. The fiber placement machine 24 can include one or more rollers or other suitable devices (not shown) for holding the innermost ply 22 in place during application of the fiber tows 28 to avoid wrinkling of the innermost ply 22. The fiber placement machine 24 can apply multiple plies in various patterns. For example, in one embodiment, the fiber placement machine 24 can lay down plies on a −45/0/+45 degree bias to provide desired structural properties. In other embodiments, other ply patterns and/or other orientations may be used to provide other structural properties. In addition, hand lay-ups of preimpregnated fabric plies can also be applied over and in between tow plies to provide additional strength around cut outs and other localized features. In the foregoing manner, the fiber tows 28 together with the innermost ply 22 form a continuous cylindrical skin or laminate 30 extending around the plurality of stiffeners.

In the embodiment described above, the fiber placement machine 24 applies fiber tows (e.g., carbon fiber tows preimpregnated with a thermoset epoxy resin) to the laminate 30. Such fiber tows can have widths from about 0.06 inch to about 0.50 inch (e.g., about 0.38 inch) after flattening by a compaction roller. In other embodiments, the fiber placement machine can apply other types of tows, e.g., glass fiber tows, graphite fiber tows, and/or tows including other types of aramid fibers and resins.

In another embodiment, the fiber placement machine 24 can apply fiber tape and/or slit fiber tape to the laminate 30 as the mandrel 14 rotates. The fiber tape can include a plurality of unidirectional fibers, such as carbon fibers. The fibers may be interwoven with another material into a cloth tape, and/or the fibers may be held together by a backing paper that is removed prior to application.

In a further embodiment, the fiber placement machine 24 can apply individual filaments to the laminate 30 in a filament winding process. In yet another embodiment, the fiber placement machine 24 can apply various combinations of the foregoing composite materials, as well as composite fabric sheets, to the laminate 30. The final layer of material applied to the laminate 30 can include a woven wire fabric that provides both structural load carrying capability and lightning protection. In the foregoing embodiments, the mandrel 14 rotates about the longitudinal axis L as the fiber placement machine 24 applies material. In other embodiments, however, the mandrel 14 may be rotationally fixed, and the fiber placement machine 24 may be moved around the outside of the mandrel 14 to apply material. After the final layer of material has been applied, the tool support structure 16 transports the mandrel 14 from the layup station 12 to a vacuum station via the tracks 20.

In accordance with one embodiment, the vacuum station (not shown in the drawings) comprises opposing pressure pad supports movably positioned on opposite sides of the tracks. Each of the pressure pad supports carries a corresponding pressure pad. In operation, the pressure pad supports move inwardly toward the mandrel to position the corresponding pressure pads around the laminate in a clam-shell configuration. In one embodiment, the pressure pads can include conformable pressure pads and/or caul sheets (item 46 in FIG. 6) configured to apply even pressure to the laminate during subsequent curing to produce a relatively smooth exterior surface. Once the pressure pads have been installed on the laminate, the pressure pad supports are retracted and a vacuum bag (items 48 in FIG. 6) may be installed around the pressure pads and the laminate. After the vacuum bag 48 has been evacuated, the mandrel is lifted off of the tool support structure and moved to the curing station (not shown in the drawings) via an overhead gantry beam. In other embodiments, the vacuum bag may be omitted and the laminate may be co-cured without prior evacuation.

In accordance with one embodiment, the gantry beam extends from the vacuum station into an autoclave (not shown in the drawings) positioned in the curing station. A first door of the autoclave may be retracted to allow the mandrel to be moved into the autoclave on the gantry beam. Once the mandrel is positioned fully within the autoclave, the first door is closed and then the temperature inside the autoclave is elevated to co-cure the laminate and the stiffeners. In one embodiment, the autoclave can co-cure the laminate and the stiffeners using a standard 350° F. cure cycle. In other embodiments, other cure cycles may be used depending on various factors such as material composition, thickness, etc. Once the parts have cooled, a second door of the autoclave is retracted, and the mandrel is moved out of the autoclave and to the inspection station via the gantry beam. In other embodiments, the curing station can include other systems for moving the mandrel in and out of the autoclave. Such systems can include, for example, an autoclave cart, ground-based rails, etc.

Thereafter, the laminate may be further processed at inspection, trimming and final assembly stations in the same manner as previously described in U.S. patent application Ser. No. 10/851,381, which is incorporated herein in its entirety by reference (see, e.g., FIGS. 10-13 in that application).

Figure 4:
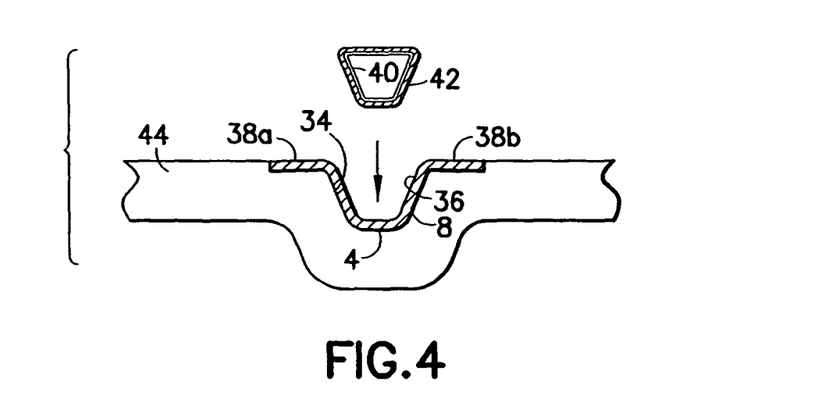
FIGS. 4-6 are illustrations showing respective cross-sectional end views of stages in a method for bonding a composite stiffener to a composite laminate in accordance with one embodiment.
Figure 5:
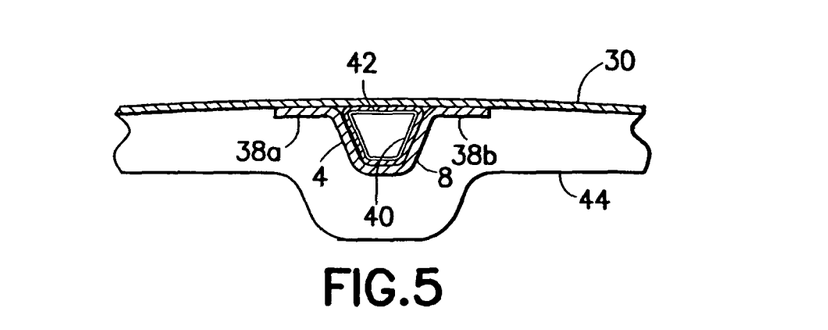
Figure 6:
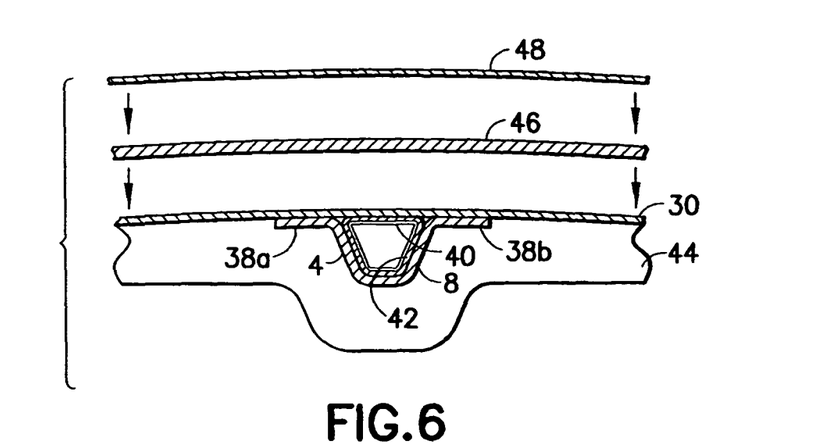

FIGS. 4-6 are cross-sectional end views illustrating various stages of a method for bonding a stiffener 4 to a laminate 30 in accordance with one embodiment. Referring to FIG. 4, the uncured stiffener 4 may be positioned in a groove 34 formed in a facesheet 44 of the mandrel, which facesheet is made of composite material, e.g. carbon fabric/epoxy composite material. The facesheet 44 will be formed with a plurality of grooves spaced at equal angular intervals about the circumference of the mandrel and extending in generally lengthwise directions, each groove receiving a respective stiffener. Each stiffener may be a hat section stiffener (i.e., hat stringer) of the type previously described with reference to FIG. 2.

Referring again to FIG. 4, after the stiffener 4 is positioned in the groove 34, a flexible tubular bladder 40 supporting a portion of fabric 42 (or tape, etc.) is positioned inside the stiffener 4 and inflated with gas (e.g., nitrogen at 90 psi) so that the fabric 42 contacts an interior surface 36 of the stiffener 4 between opposing flange portions 38a and 38b.

Referring to FIG. 5, once the bladder 40 and the fabric 42 are positioned inside the stiffener 4, composite materials are laminated over the facesheet 44 of the mandrel in a manner previously described to form a skin 30 that contacts the flange portions 38a, 38b and the fabric 42.

Referring to FIG. 6, a compressible pad or caul sheet 46 is positioned over the skin 30. Next, a vacuum bag 48 is positioned around the caul sheet 46 and the mandrel. The space between the vacuum bag 48 and the bladder 40 is then evacuated to apply an even pressure against the composite parts (i.e., stiffener 4, skin 30, and fabric 42). The composite parts are then co-cured at an elevated temperature while under vacuum. After curing, the stiffener/laminate combination is debagged and separated from the mandrel.

In one embodiment of the method described above with reference to FIGS. 4-6, the stiffeners 4 may be manufactured by laying-up one or more plies of material directly onto the facesheet 44 of the mandrel. In another embodiment, the stiffeners may be precured, or at least partially precured, before placement on the mandrel facesheet. When precured stiffeners are used, they may be secondarily bonded to the skin 30 with an adhesive during the subsequent curing process.

One feature of the foregoing method is that the fabric 42 serves as an inner doubler bonding the inner surface of the stiffener 4 to an adjacent portion of the skin 30 between the opposing flange portions 38a, 38b. One advantage of this feature is that the fabric 42 reduces the peel stresses on the flange portions 38a, 38b. As a result, there is less tendency for the stiffener 4 to disbond from the skin 30 under high hoop loads that may be encountered in service.

During cure, the barrel section lay-up reduces in thickness or debulks as compared to its laid-up non-cured state. This debulking process, while making a barrel section, has a propensity for producing out-of-plane fiber distortion, e.g., fiber waviness or fiber wrinkling, in the laminated skin. Such fiber waviness or wrinkling is not acceptable in cured barrel sections and will be rejected as being non-conforming to the design and/or the specifications for form, fit or function.

In accordance with the broad concept of the disclosed embodiments, out-of-plane fiber distortion in a one-piece composite barrel section is reduced by "growing" the tool (mandrel) during the curing process to a greater extent than the barrel section being cured. This is accomplished by designing in a sufficient differential in the respective coefficients of thermal expansion (CTEs) of the mandrel and barrel section lay-up in the hoopwise direction ($CTE_{hoop}$). This can be accomplished, for example, by manufacturing a mandrel made of composite material (e.g., carbon fabric and epoxy) and having longitudinal grooves distributed at angular intervals (equal or unequal) around the circumference of the mandrel.

Figure 7:
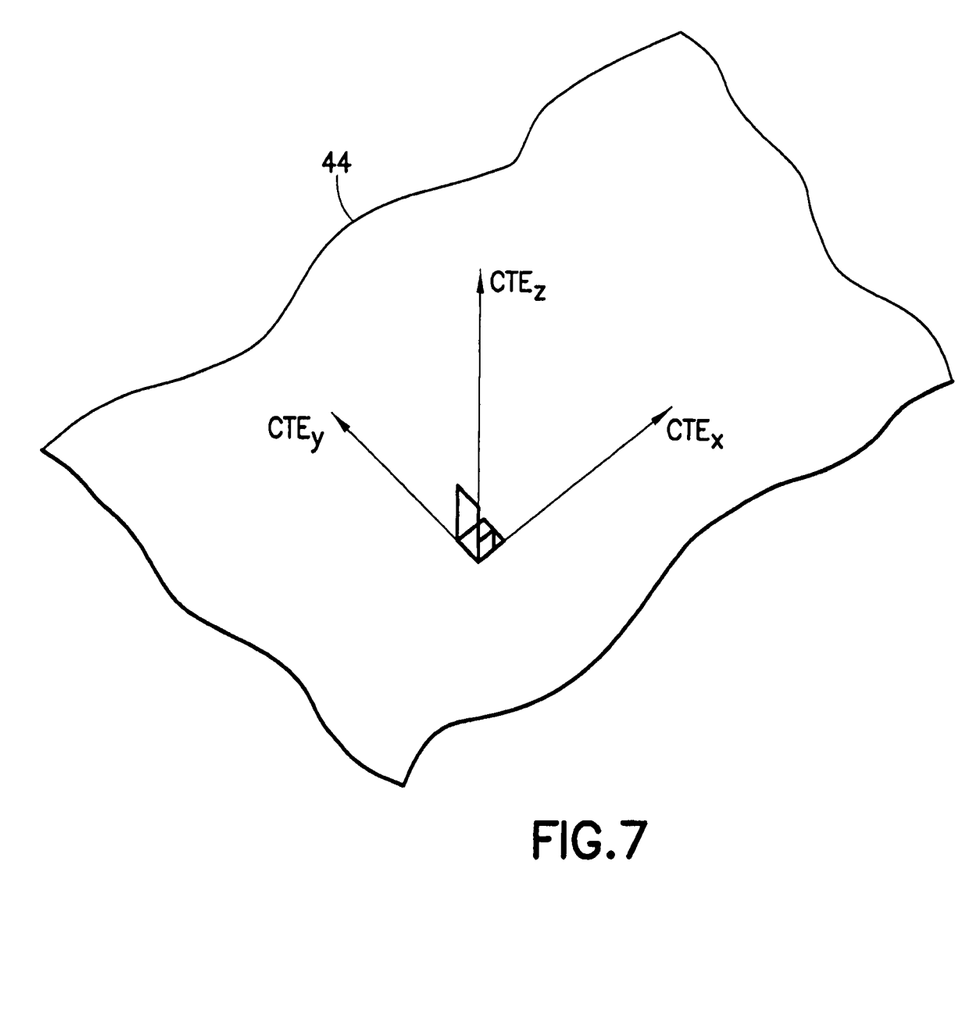
FIG. 7 is an illustration showing a coordinate system in which the Z axis is normal to the circumferential surface of a mandrel.

The in-plane coefficients of thermal expansion of facesheet 44 in the X and Y directions are represented by arrows respectively labeled $CTE_X$ and $CTE_Y$ in FIG. 7. $CTE_X$ and $CTE_Y$ are shown to illustrate in-plane thermal expansion and are not intended to limit the direction of in-plane thermal expansion. $CTE_Z$ is the coefficient of thermal expansion in the Z direction and is normal to the in-plane thermal expansion $CTE_X$ and $CTE_Y$. In the case of composite material whose reinforcing fibers are lying in the X-Y plane, $CTE_Z$ is about 10 times greater than either $CTE_X$ or $CTE_Y$ because in-plane thermal expansion of the resin is restricted by the reinforcing fibers, while no similar restriction exists in the Z direction. $CTE_Z$ is resin dominated.

Figure 8:
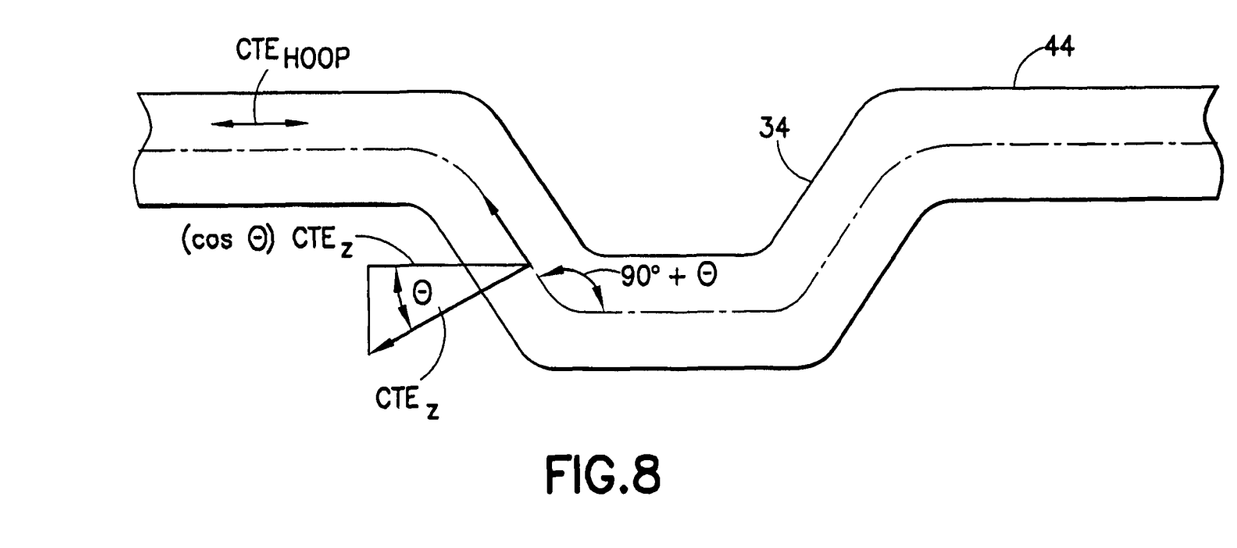
FIG. 8 is an illustration showing the contribution of the Z direction component to the hoopwise coefficient of thermal expansion in a grooved mandrel made of composite material, e.g., reinforcing fabric and epoxy.

In the case of a grooved composite mandrel of the type disclosed herein, however, the coefficient of thermal expansion $CTE_{hoop}$ in the hoopwise direction, along the sides of the groove, picks up a component of the coefficient of thermal expansion in the Z direction, as depicted in FIG. 8. Variance in the number of longitudinal grooves distributed around the circumference of the mandrel varies the amount of $CTE_Z$ translated into $CTE_{hoop}$.

For the construction shown in FIG. 8, layers of carbon fabric in a cured epoxy resin matrix are laid on the interior surface of a master mold having a plurality of axial ribs to form facesheet 44 of the mandrel. These ribs inside the master mold form the grooves 34 in the facesheet 44. The carbon fibers extending in the hoopwise direction follow the contour of the groove. Along the angled wall of the groove 34, the coefficient of thermal expansion in the Z direction (i.e., normal to the reinforcing fiber) is indicated by the vector $CTE_Z$. At the same point, the coefficient of thermal expansion in the hoopwise direction will include the component $(\cos \Theta)CTE_Z$ in addition to any in-plane thermal expansion. In-plane thermal expansion can be ignored because it is about the same as the in-plane thermal expansion of the layup. Because the coefficient of thermal expansion in the hoopwise direction in a grooved area is increased due to the Z direction component as compared to the coefficient of thermal expansion in the hoopwise direction in an ungrooved area, this creates a differential in coefficients of thermal expansion in the hoopwise direction for the mandrel and the barrel-shaped part being fabricated, the former being approximately three times the latter.

As a result of this differential thermal expansion, the fibers in the laid-up barrel-shaped part are stretched during curing, thereby preventing out-of-plane fiber distortion in the plies of that composite during debulking. The CTE differential in the hoopwise direction forces the barrel section lay-up to "grow" radially as the mandrel expands during cure, thereby stretching the barrel section lay-up and eliminating fiber distortion due to debulking. More particularly, in cases where a barrel section having a plurality of lengthwise hat stringers is being fabricated, a design is preferred wherein the mandrel and barrel section have moderate difference in CTEs in the hoopwise direction and insubstantial difference in CTEs in the lengthwise direction.

Figures 9, 10, 11:
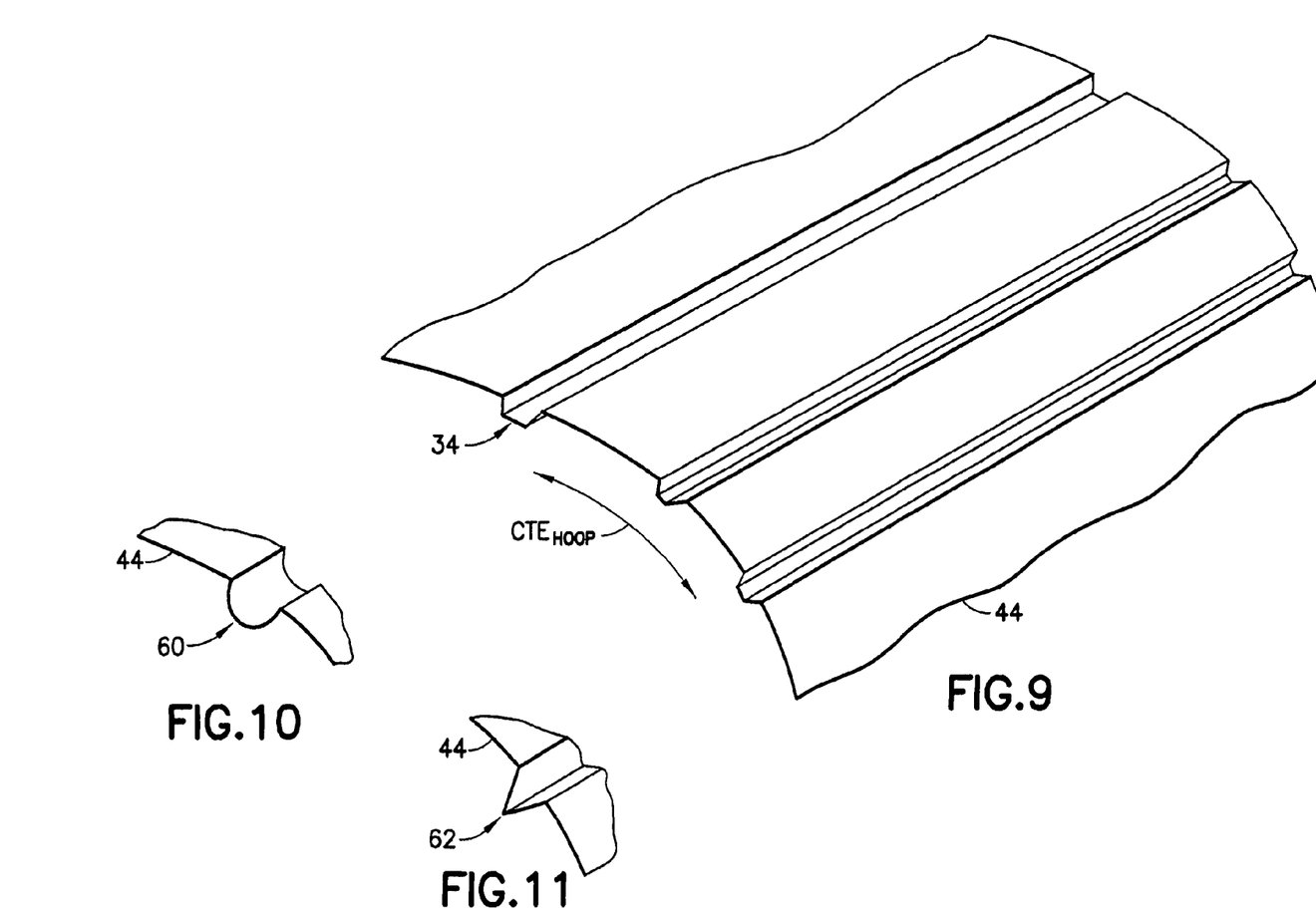
FIG. 9 is an illustration showing a portion of a generally cylindrical mandrel having longitudinal grooves of a generally trapezoidal shape.
FIG. 10 is an illustration showing a portion of a mandrel having semicircular grooves.
FIG. 11 is an illustration showing a portion of a mandrel having V-shaped grooves.

One embodiment of the mandrel has a grooved facesheet 44, a portion of which is shown in FIG. 9. In this example, the facesheet 44 takes the form of a hollow cylinder with a plurality of grooves spaced at equal or unequal angular intervals about the circumference of the mandrel and extending in a generally lengthwise or longitudinal direction for fabrication of cylindrical barrel sections. Each groove 34 seen in FIG. 9 has a generally trapezoidal cross section. Instead of sharp corners, such a trapezoidal groove may have a cross section that curves continuously, ramping inward from both sides at an approximately 60-degree angle with a radiused transition to the bottom. Other groove cross-sectional shapes are also possible, such as the semi-circular groove 60 partly shown in FIG. 10 or the V-shaped groove 62 partly shown in FIG. 11, to name a few.

In accordance with one implementation, the facesheet 44 is made of a composite material comprising carbon fabric in an epoxy matrix. Other material may be used singularly or in combination to fabricate facesheet 44. Such other materials may include aluminum, steel, brass, lead, ceramics, glass, stone, to name only a few. These materials may also be combined with composites. For instance, facesheet 44 may be fabricated with the grooved portions made of composite material and the sections between the grooves fabricated from a metal such as steel. Combining materials of differing coefficients of thermal expansion in a mandrel may create a sufficient $CTE_{hoop}$ without relying upon the geometry of the shaped grooves to increase $CTE_{hoop}$. The grooves along with the groove-induced increase in $CTE_{hoop}$ may be dispensed with or the grooves may be fabricated in a way that the $CTE_{hoop}$ is not significantly increased, such as by milling or trimming, shown by grooves 34 in FIG. 12.

Referring back to FIG. 5, in accordance with one method of fabrication, the composite laminate 30, also comprising composite material, is laid on or wrapped around the assembly comprising a mandrel facesheet 44 with grooves 34 occupied by stiffeners 4 and bladders 40. During curing in an autoclave, the mandrel facesheet 44 expands radially outward, which causes at least the innermost plies of the laminate 30 laid thereon to stretch in a hoopwise (i.e., circumferential) direction. The mandrel and the laminate are designed so that when the innermost plies are stretched, the circumference of the outer plies does not decrease despite the debulking that occurs during curing, i.e., the outer plies are also stretched or maintain substantially the same circumference. The epoxy cures fully while the plies are in this stretched condition.

In general, it is desired that the mandrel be made of material that is not homogeneous, e.g., composite material. In accordance with one embodiment, the mandrel comprises a body having a lengthwise axis and an outer circumferential surface with a plurality of grooves extending in directions generally parallel to the lengthwise axis and spaced apart from each other. In particular, the mandrel facesheet has a coefficient of thermal expansion in a direction parallel to the lengthwise axis that is significantly smaller than its coefficient of thermal expansion in the hoopwise direction. This is accomplished because the Z direction component of the CTE of the mandrel facesheet (which is resin dominated) is realized in the grooved areas (see FIG. 8).

In one implementation, the mandrel facesheet is a laminate formed by laying composite material (e.g., plies of carbon fabric impregnated in resin) inside an inner circumferential surface of a master mold and then curing the composite material of the laid fabric. The fabric may be laid at varying angles, e.g., −45/+45 or 0/+90 degrees. The master mold may have ribs formed therein so that the laminate built up during fabric lay-up of the mandrel facesheet will have grooves for receiving the barrel section stiffeners. Alternatively, the mandrel may consist of multiple longitudinal segments that approximate a barrel section. Each longitudinal segment may be individually formed in a separate mold.

In either case, preferably the grooved outer circumferential surface of the mandrel (whether one-piece or segmented) is coated with wax or other release material to facilitate separation of the mandrel from the laminated barrel section during cooling after curing.

Figures 12, 13, 14, 15:
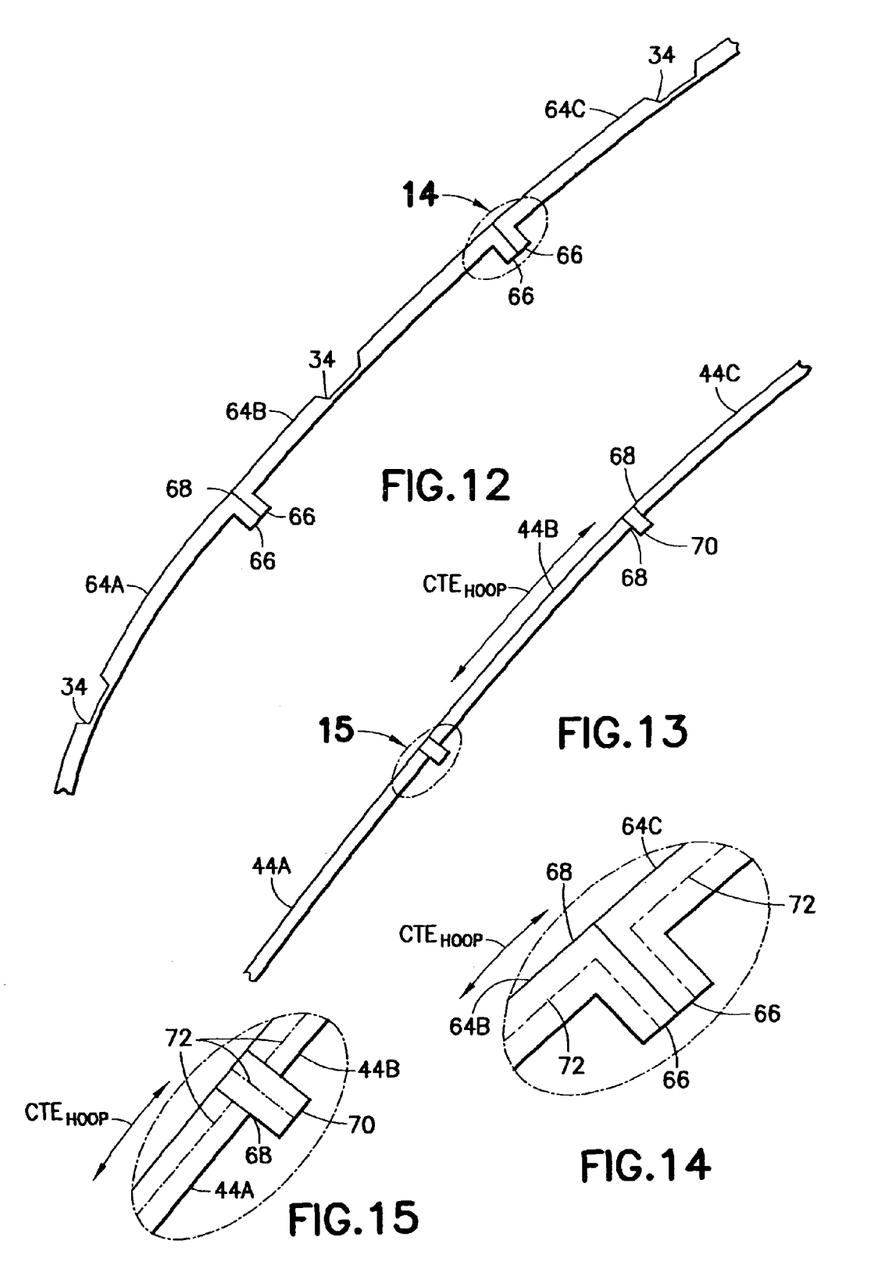
FIG. 12 is an illustration showing a cross-sectional end view of a portion of a generally cylindrical mandrel comprising segments in accordance with another embodiment.
FIG. 13 is an illustration showing a cross-sectional end view of a portion of a generally cylindrical mandrel comprising segments separated by support blocks in accordance with a further embodiment.
FIG. 14 is an illustration showing a portion of FIG. 12 on an enlarged scale.
FIG. 15 is an illustration showing a portion of FIG. 13 on an enlarged scale.

Referring again to FIG. 12, another embodiment of the mandrel may comprise a plurality of facesheet segments (see, e.g., segments 64A-C), each segment having a lip 66 along at least one longitudinal edge 68. FIG. 12 shows the case wherein both longitudinal edges of each facesheet segment have lips 66. The facesheet sections 64A, 64B, 64C, etc. may be arranged with abutting lips to form a segmented mandrel, partly seen in FIG. 12. This segmented mandrel may have a final shape that approximates at least a portion of a barrel section. As shown in FIG. 14, the in-plane ply lay-up of facesheet section 44A has a bend of about 90 degrees at a longitudinal edge and into lip 66, as illustrated by dash-dot ply direction lines 72. The facesheet segments with lips may be coupled together by fasteners or clamps or any other suitable means that do not restrict $CTE_z$ in lip 66. Combining geometries to take advantage of differing coefficients of thermal expansion in the mandrel may create a sufficient $CTE_{hoop}$ without relying upon the geometry of the shaped grooves to increase $CTE_{hoop}$. The grooves along with the groove induced increase in $CTE_{hoop}$ may be dispensed with as shown in FIG. 13, or the grooves may be fabricated in a way that the $CTE_{hoop}$ is not significantly increased, such as by milling or trimming, shown by grooves 34 in FIG. 12.

Another embodiment of the mandrel may comprise a plurality of facesheet segments (see, e.g., segments 44A-C in FIG. 13), each segment having no lips along either longitudinal edge 68. At least one spacing block 70 may be located between longitudinal edges 68 of each pair of adjoining facesheet segments. A plurality of such facesheet sections and spacing blocks may be arranged to form a segmented mandrel, as partly shown in FIG. 13. This segmented mandrel may have a final shape that approximates at least a portion of a barrel section. Each facesheet segment and each spacing block may comprise a composite laminate. In-plane ply lay-up for such a case is illustrated by dash-dot ply direction lines 72 in segments 44A and 44B and spacing block 70. The facesheet segments may be coupled to the spacing blocks 70 by fasteners or clamps or any other suitable means that do not restrict $CTE_Z$ in spacing block 70. Again combining geometries to take advantage of differing coefficients of thermal expansion in the mandrel may create a sufficient $CTE_{hoop}$ without relying upon the geometry of the shaped grooves to increase $CTE_{hoop}$. The grooves along with the groove-induced increase in $CTE_{hoop}$ may be dispensed with as shown in FIG. 13, or the grooves may be fabricated in a way that the $CTE_{hoop}$ is not significantly increased, such as by milling or trimming, shown by grooves 34 in FIG. 12.

The embodiments of the mandrel partly shown in FIGS. 14 and 15 rely upon translating the significant $CTE_z$ of lip 66 and spacing block 70 respectively into increased $CTE_{hoop}$. The increased $CTE_{hoop}$ in either embodiment may be significantly greater than the $CTE_{hoop}$ derived only from $CTE_x$ and/or $CTE_y$. A few lips 66 and/or spacing blocks 70 arranged longitudinally around the circumference of the mandrel will result in less of an increase in the $CTE_{hoop}$ than many lips 66 and/or spacing blocks 70 arranged longitudinally around the circumference of the mandrel. Varying the thickness and/or internal structure and/or composition of the laminate of lip 66 or spacing block 70 varies the $CTE_z$, resulting in $CTE_{hoop}$ variance.

Referring again to FIG. 12, grooves 34 may be formed in facesheet segments by any suitable means such as, but not limited to, milling or trimming. Grooves 34 may provide space for co-curing of stiffeners, such as stringers or longerons. Grooves 34 may be shaped to accommodate hat section, Z-section, T-section or any other suitable configuration to accommodate a stiffener.

Figures 16, 17, 18:
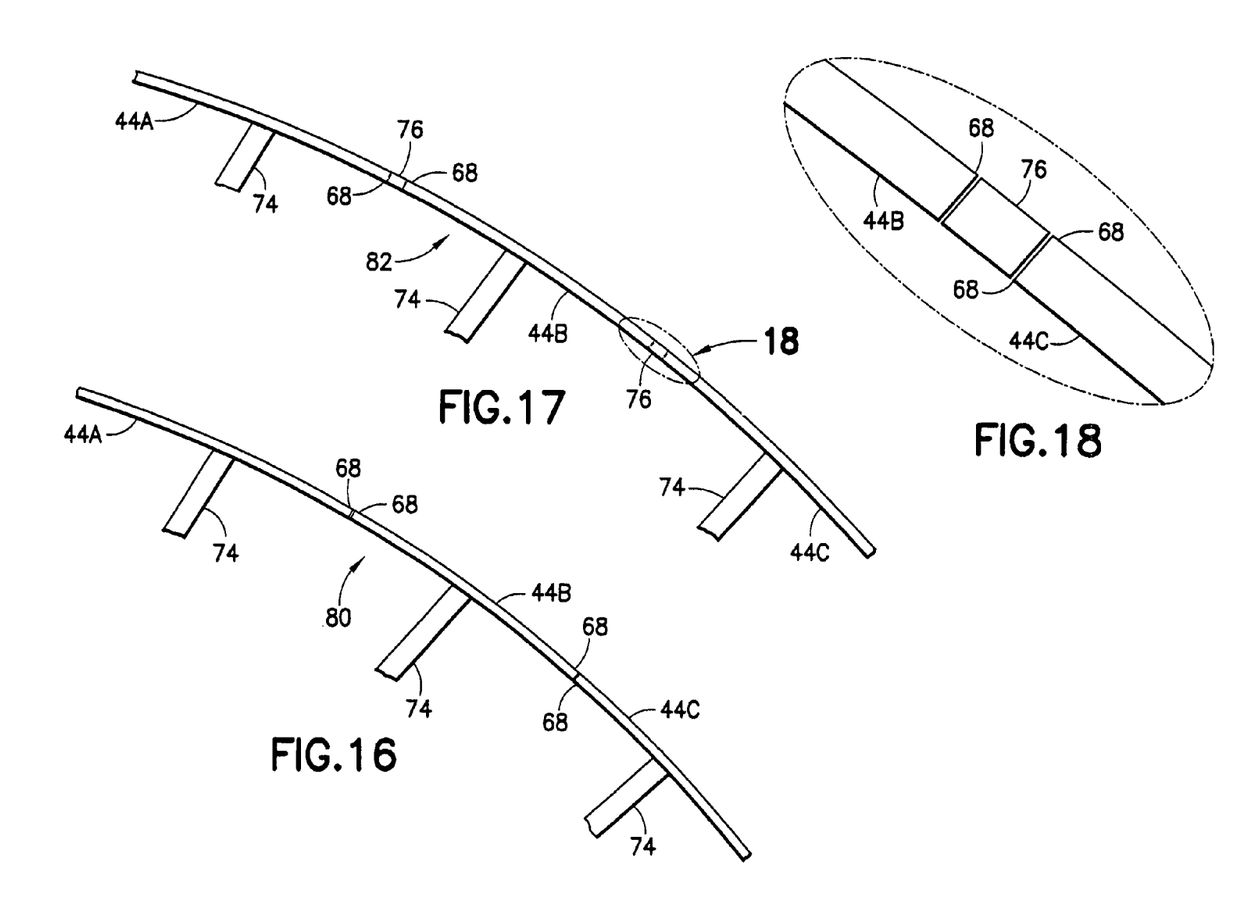
FIGS. 16 and 17 are illustrations showing a cross-sectional end view of a portion of an expandable mandrel in unexpanded and expanded states respectively in accordance with yet another embodiment.
FIG. 18 is an illustration showing a portion of FIG. 17 on an enlarged scale.

Yet another embodiment of the mandrel may have one or more facesheet segments (e.g., segments 44A-C seen in FIG. 16) that are displaced radially outwardly, causing the mandrel to change from an unexpanded state to an expanded state. Each facesheet segment may comprise a pair of longitudinal edges 68. A plurality of facesheet segments may be arranged in retracted positions (i.e., mandrel in an unexpanded state 80) as shown in FIG. 16, with confronting longitudinal edges adjacent to each other, each segment being supported by a respective movable support structure 74, only one member of each support structure being visible in FIG. 16. Each support structure may be displaced radially outwardly, causing the facesheet segments (e.g., 44A-C) to move to respective extended positions (i.e., mandrel in an expanded state 82) during the curing process, as shown in FIG. 17. Moving the facesheet segments from retracted to extended positions causes the circumference of the mandrel to expand and may stretch one or more plies of the composite ply assembly laid thereon along a generally circumferential direction. This expansion during debulking of the composite ply assembly helps prevent out-of-plane fiber distortion in the plies of the composite lay-up. The movement of support structures 74 may be actuated by any suitable means, including, but not limited to, a biasing mechanism, pneumatic or hydraulic actuation, or motor propulsion. Any gaps between facesheet segments when the mandrel is expanded may be filled by filler 76 (see FIG. 18) to support the composite lay-up. Filler 76 may be fabricated from any suitable material such as metal or composite to name a few. Filler 76 may be coupled to at least one facesheet segment such that it can be moved into position during or after extension of the facesheet segments.

Figure 19:
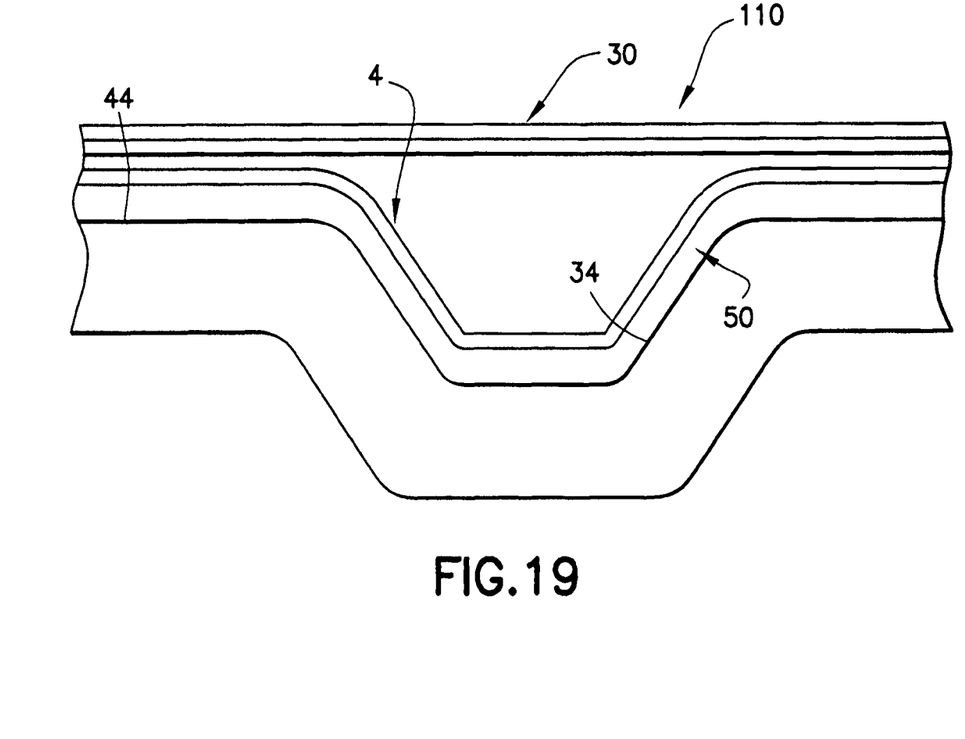
FIG. 19 is an illustration showing a cross-sectional end view of a stage in the method for bonding a composite stiffener to a composite laminate in accordance with one embodiment. The depicted stage is after curing and cooling.

FIG. 19 shows a stage in the method of fabrication after curing and cooling, and after the bladders have been deflated and removed. During lay-up cooling, the facesheet segments are moved back to the retracted positions, causing the mandrel to separate from the stiffened barrel section, as indicated by gap 50 shown in FIG. 19. This separation facilitates removal of the mandrel from the barrel section 110. Because the laminate debulks (i.e., reduces in thickness) during curing without reducing the circumference of the carbon fibers in the outer plies, out-of-plane fiber distortion may be reduced to acceptable levels, if not eliminated entirely.

Many modifications and other embodiments will come to mind to one skilled in the art to which this disclosure pertains having the benefit of the teachings presented in the foregoing descriptions and the associated drawings. Therefore, it is to be understood that the appended claims are not to be limited to the specific embodiments disclosed and that modifications and other embodiments are intended to be included within their scope. Although specific terms are employed herein, they are used in a generic and descriptive sense only and not for purposes of limitation.

As used in the claims, the term "circumference" should be construed broadly to encompass non-circular as well as circular lines.

The invention claimed is:

1. A method for fabricating a one-piece composite barrel section, comprising the following steps:
   (a) molding a plurality of mandrel segments made of composite material, each mandrel segment having a plurality of longitudinal grooves on its outer circumferential surface, each groove having a contoured profile in cross section determined by axial ribs on an interior surface of a mold, the mandrel segments being made of composite material comprising reinforcing fibers that follow the contours of the grooves in a manner that increases the coefficient of thermal expansion in a hoopwise direction in the areas of the grooves as compared to the coefficient of thermal expansion in the hoopwise direction in ungrooved areas of the mandrel;
   (b) separating each mandrel segment from the mold interior surface;
   (c) arranging the plurality of mandrel segments to form a mandrel;
   (d) laying a composite ply assembly around the mandrel; and
   (e) raising the temperature and pressure within a volume surrounding the composite ply assembly, the temperature increase being sufficient to cause the circumference of said mandrel to expand,
   the mandrel and the composite ply assembly having a not insubstantial difference in coefficients of thermal expansion in a hoopwise direction and an insubstantial difference in coefficients of thermal expansion in a lengthwise direction, the coefficient of thermal expansion of the mandrel in said hoopwise direction being greater than the coefficient of thermal expansion of said composite ply assembly in said hoopwise direction such that one or more plies of the composite ply assembly is stretched during step (e).

2. The method as recited in claim 1, further comprising the steps of:
   lowering the temperature and pressure within the volume; and
   separating the mandrel from the composite ply assembly after the latter has cooled.

3. The method as recited in claim 1, wherein during and after expansion, the circumference of one or more outermost plies of the composite ply assembly does not decrease by an amount sufficient to cause significant waviness or wrinkling in the composite ply assembly.

4. The method as recited in claim 1, wherein during expansion, the mandrel and the composite ply assembly expand in a lengthwise direction by substantially the same amount.

5. The method as recited in claim 1, wherein layup comprises the following steps:
   (i) placing a portion of a respective hat stringer in a respective one of said plurality of grooves, each hat stringer being made of multiple plies of composite material;
   (ii) placing a respective bladder in said portion of said respective hat stringer after step (i) has been performed; and
   (iii) laying multiple plies of composite material around the outer circumferential surface of the mandrel and the bladders.

6. The method as recited in claim 1, wherein each ply of the composite ply assembly comprises reinforcing fibers or fabric and polymeric material.

7. The method as recited in claim 1, wherein an outer circumferential portion of the mandrel comprises reinforcing fabric and polymeric material.

8. The method as recited in claim 1, further comprising the following steps, performed after step (a) and before step (b):
   surrounding the composite ply assembly with a sealed air-impermeable sheet to form an evacuable space; and
   evacuating the evacuable space.

9. The method as recited in claim 1, wherein step (a) comprises:
   laying a composite ply assembly on an interior surface of a mold having a plurality of axial ribs spaced at angular intervals and extending in generally lengthwise directions; and
   curing the composite ply assembly while in contact with the interior surface of the mold to form a segment of a mandrel.

10. A method for fabricating a one-piece composite barrel section, comprising the following steps:
    (a) molding a plurality of mandrel segments made of composite material, each mandrel segment having a plurality of longitudinal grooves on its outer circumferential surface determined by axial ribs on an interior surface of a mold, each groove having a contoured profile in cross section, the mandrel segments being made of composite material comprising reinforcing fibers that follow the contours of the grooves in a manner that increases the coefficient of thermal expansion in a hoopwise direction in the areas of the grooves as compared to the coefficient of thermal expansion in the hoopwise direction in ungrooved areas of the mandrel;

(b) separating each mandrel segment from the mold interior surface;

(c) arranging the plurality of mandrel segments to form a mandrel;

(d) laying a composite ply assembly around the mandrel; and (e) raising the temperature and pressure within a volume surrounding the composite ply assembly, the temperature increase being sufficient to cause the circumference of the mandrel to expand, which in turn causes the length of reinforcing fibers in one or more plies of the composite ply assembly to increase due to a difference in the coefficients of thermal expansion of the mandrel and the composite ply assembly in the hoopwise direction.

11. The method as recited in claim 10, further comprising the steps of:

lowering the temperature and pressure within the volume; and separating the mandrel from the composite ply assembly after the latter has cooled.

12. The method as recited in claim 10, wherein during and after expansion, the length of reinforcing fibers in one or more outermost plies of the composite ply assembly does not decrease by an amount sufficient to cause significant waviness or wrinkling in the composite ply assembly.

13. The method as recited in claim 10, wherein during expansion, the mandrel and the composite ply assembly expand in a lengthwise direction by substantially the same amount.

14. The method as recited in claim 10, wherein layup comprises the following steps:

(i) placing a portion of a respective hat stringer in a respective one of said plurality of grooves, each hat stringer being made of multiple plies of composite material;

(ii) placing a respective bladder in said portion of said respective hat stringer after step (i) has been performed; and (iii) laying multiple plies of composite material around the outer circumferential surface of the mandrel and the bladders.

15. The method as recited in claim 10, wherein an outer circumferential portion of the mandrel comprises reinforcing fabric and polymeric material.

16. The method as recited in claim 10, wherein step (a) comprises:

laying a composite ply assembly on an interior surface of a mold having a plurality of axial ribs spaced at angular intervals and extending in generally lengthwise directions; and curing the composite ply assembly while in contact with the interior surface of the mold to form a segment of a mandrel.

17. A method for fabricating a one-piece composite barrel section, comprising the following steps:

fabricating a mandrel having a plurality of longitudinal grooves on its outer circumferential surface by laying a composite ply assembly on an interior surface of a mold having a plurality of axial ribs spaced at angular intervals and extending in generally lengthwise directions, and then curing the composite ply assembly while in contact with the interior surface of the mold, each groove in the mandrel having a contoured profile in cross section, the mandrel being made of composite material comprising reinforcing fibers that follow the contours of the grooves in a manner that increases the coefficient of thermal expansion in a hoopwise direction in the areas of the grooves as compared to the coefficient of thermal expansion in the hoopwise direction in ungrooved areas of the mandrel;

removing the mandrel from the mold;

laying a composite ply assembly around the mandrel; and raising the temperature and pressure within a volume surrounding the composite ply assembly, the temperature increase being sufficient to cure the composite ply assembly and cause the circumference of said mandrel to expand, the mandrel and the composite ply assembly having a not insubstantial difference in coefficients of thermal expansion in a hoopwise direction and an insubstantial difference in coefficients of thermal expansion in a lengthwise direction, the coefficient of thermal expansion of the mandrel in said hoopwise direction being greater than the coefficient of thermal expansion of said composite ply assembly in said hoopwise direction such that one or more plies of the composite ply assembly is stretched during curing.

18. A method for fabricating a one-piece composite barrel section, comprising the following steps:

(a) arranging a plurality of composite mandrel segments to form a composite mandrel comprising alternating first mandrel portions and second mandrel portions arranged along a circumference of said mandrel, said first mandrel portions comprising plies lying in circumferential planes and said second mandrel portions comprising plies lying in planes disposed parallel to a longitudinal axis of said mandrel and perpendicular to the circumferential planes;

(b) laying a composite ply assembly comprising plies around the mandrel; and (c) raising the temperature and pressure within a volume surrounding the composite ply assembly, the temperature increase being sufficient to cure the composite ply assembly, the mandrel and the composite ply assembly having a not insubstantial difference in coefficients of thermal expansion in a hoopwise direction and an insubstantial difference in coefficients of thermal expansion in a lengthwise direction, the coefficient of thermal expansion of the mandrel in said hoopwise direction being greater than the coefficient of thermal expansion of said composite ply assembly in said hoopwise direction such that one or more plies of the composite ply assembly is stretched during curing.

19. The method as recited in claim 18, wherein said second mandrel portions comprise respective lips of said mandrel segments.

20. The method as recited in claim 18, wherein said second mandrel portions comprise respective spacing blocks disposed between adjacent mandrel segments.

* * * * *